No. 765,297. PATENTED JULY 19, 1904.
D. C. SCOTT.
REIN HOLDER.
APPLICATION FILED JAN. 26, 1904.
NO MODEL.

Witnesses

Daniel C. Scott, Inventor
by C.A.Snow & Co
Attorneys

No. 765,297. Patented July 19, 1904.

UNITED STATES PATENT OFFICE.

DANIEL CLARK SCOTT, OF WALTER, OKLAHOMA TERRITORY.

REIN-HOLDER.

SPECIFICATION forming part of Letters Patent No. 765,297, dated July 19, 1904.

Application filed January 26, 1904. Serial No. 190,703. (No model.)

*To all whom it may concern:*

Be it known that I, DANIEL CLARK SCOTT, a citizen of the United States, residing at Walter, in the county of Comanche, Oklahoma Territory, have invented a new and useful Rein-Holder, of which the following is a specification.

This invention relates to a combined rein-holder and vehicle-step.

The object of the invention is to provide a simple, inexpensive, and efficient device of this character designed for attachment to wagons, carriages, and other vehicles and adapted to perform the dual functions of a vehicle-step and a holder or support for the reins.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

Figure 1:
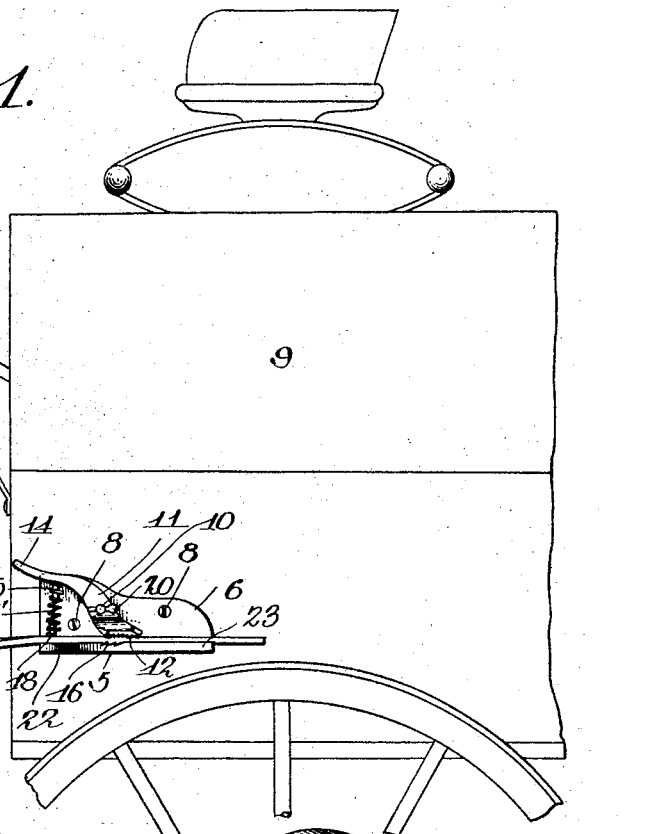
Figure 3:
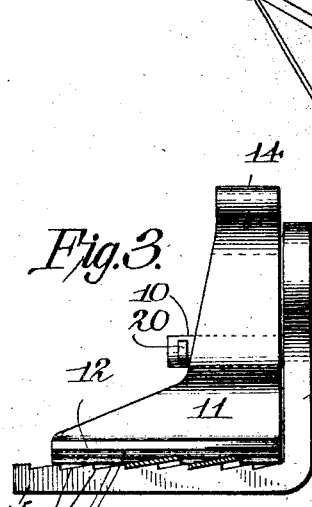
Figure 2:
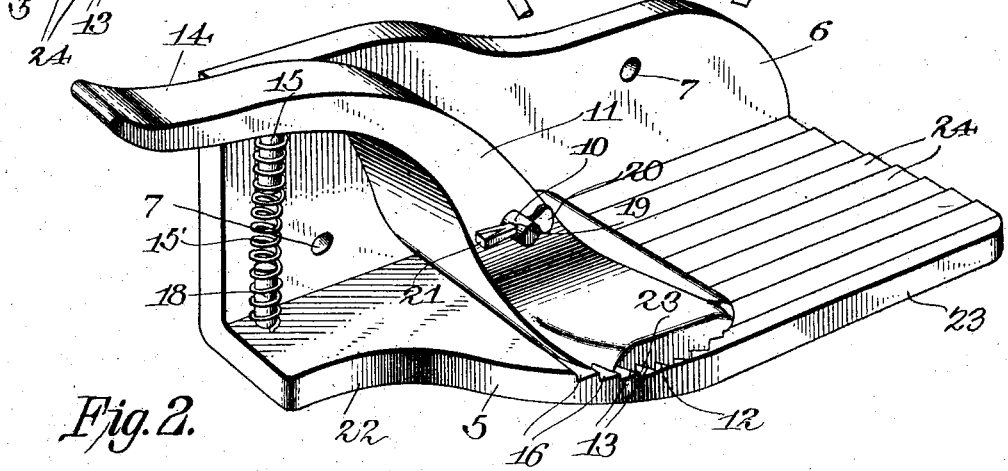

In the accompanying drawings, forming a part of this specification, Figure 1 is a side elevation of a portion of a wagon, showing my combined step and rein-holder applied thereto. Fig. 2 is a detail perspective view of the device detached. Fig. 3 is an end view.

Similar numerals of reference indicate corresponding parts in all the figures of the drawings.

The device consists of a bed-piece 5, formed of metal or other suitable material, having an angularly-disposed flange 6, preferably formed integral therewith, as shown, said flange being provided with openings 7 for the reception of bolts or other suitable fastening devices 8, by means of which the bed-piece may be secured to the body portion of a wagon or other vehicle 9. Extending laterally from the flange 6 and preferably formed integral therewith is a pin or stud 10, and pivotally mounted on said stud is a clamping member 11, the cam-face 12 of which is provided with a series of transversely-disposed teeth or serrations 13, which engage the reins and clamp the latter between the pivoted clamping member 11 and the bed-piece, as clearly shown in Fig. 1 of the drawings. The clamping member 12 is provided with an operating-handle 14, having a depending lug 15 formed thereon, and mounted on said lug and interposed between the handle and the bed-piece 5 is a coiled spring 15', which normally forces the teeth 13 of the member 11 in engagement with corresponding teeth 16, formed in the bed-piece immediately below said member. The lower end of the spring 15' is mounted on a lug or boss 18, extending upwardly from the bed-piece 5, said lug serving to retain the spring in its proper position thereon. Passing through an opening 19 in the end of the stud 10 is a cotter-pin 20, and engaging the bifurcated end of said pin is a key or wedge 21, which locks the pin within the opening 19, and thereby prevents accidental displacement of the pivoted clamping member 11.

The front end of the bed-piece 5 is curved inwardly, as indicated at 22, the rear end thereof being extended beyond the clamping member 11 to form a step 23 and provided with a plurality of longitudinally-disposed teeth 24, which form a roughened surface for the step and also serve to prevent lateral displacement of the reins when the same are clamped on the bed-piece, as clearly shown in Fig. 3.

In operation the handle 14 is depressed and the reins inserted between the serrated faces of the member 11 and the bed-piece, with the ends of the lines lying parallel with and engaging the teeth on the step 23. When the lines are thus clamped, any forward movement of the team will cause the cam-face 12 to engage the lines more firmly, while lateral displacement of said lines will be effectually prevented by engagement with the longitudinal teeth 24. To release the reins or lines, it is simply necessary to depress the handle or exert a slight rearward pull on the lines, as will be readily understood.

The extension of the bed-piece 5 forms a convenient step to assist the driver or other person to enter the vehicle, while the longitudinal teeth not only form a roughened surface for the step, but also form guides for the ends of the reins and prevent lateral displacement of the same.

Having thus described the invention, what is claimed is—

1. In a device of the class described, a fixed and a movable clamping member, the clamping-face of the fixed member being extended beyond the movable member to form a step.

2. In a device of the class described, a fixed and a movable clamping member, the clamping-face of the fixed member being extended beyond the corresponding clamping-face of the movable member to form a vehicle-step the tread of which is roughened.

3. In a device of the class described, a fixed and a movable clamping member, the clamping-face of the fixed member being extended beyond the movable member to form a vehicle-step the tread of which is grooved or serrated longitudinally.

4. In a device of the class described, a bed-piece provided with an angularly-disposed flange, and a clamping member pivoted to the flange and adapted to engage the bed-piece, said bed-piece being extended beyond the pivoted clamping member to form a step.

5. In a device of the class described, a bed-piece provided with an angularly-disposed flange and having a series of transversely-disposed teeth formed therein, a clamping member having a roughened cam-face pivoted to the flange, and a spring interposed between the clamping member and the bed-piece, said bed-piece being extended beyond the clamping member to form a step.

6. In a device of the class described, a bed-piece having a clamping-face and provided with a flange arranged at right angles thereto, a clamping member pivoted to the flange, and a spring for holding the pivoted member normally in engagement with the clamping-face of the bed-piece, said bed-piece being extended beyond the pivoted member to form a step.

7. In a device of the class described, the combination with a vehicle, of a bed-piece provided with an angularly-disposed flange having openings formed therein, bolts passing through said openings for securing the bed-piece to the vehicle-body, a stud extending laterally from the flange and provided with a terminal opening, a clamping member pivotally mounted on said stud, a split pin engaging the terminal opening in the stud, a wedge engaging the bifurcated end of the pin, and a spring interposed between the bed-piece and pivoted clamping member for holding the latter normally in engagement with the bed-piece.

8. In a device of the class described, a bed-piece having a clamping-face and provided with a flange arranged at an angle thereto, a clamping member provided with an operating-handle pivoted to the flange, lugs secured to the handle and bed-piece, and a spring engaging said lugs for holding the pivoted clamping member in engagement with the bed-piece, said bed-piece being extended beyond the clamping-face to form a step.

In testimony that I claim the foregoing as my own I have hereto affixed my signature in the presence of two witnesses.

DANIEL CLARK SCOTT.

Witnesses:
  G. K. HAGANS,
  ALLEN FIELDS.